(12) United States Patent
Hetrick et al.

(10) Patent No.: US 11,878,801 B2
(45) Date of Patent: Jan. 23, 2024

(54) ADJUSTABLE AFT PIVOT ASSEMBLY RELEASE COMPONENT

(71) Applicant: Raytheon Company, Waltham, MA (US)

(72) Inventors: Benjamin Hetrick, Dallas, TX (US); Matthew Bangerter, Dallas, TX (US); Christopher K. Solecki, McKinney, TX (US); Zachary Scott Zutavern, Dallas, TX (US); Scott E. Herrmann, Dallas, TX (US)

(73) Assignee: Raytheon Company, Tewksbury, MA (US)

( * ) Notice: Subject to any disclaimer, the term of this patent is extended or adjusted under 35 U.S.C. 154(b) by 48 days.

(21) Appl. No.: 17/732,817

(22) Filed: Apr. 29, 2022

(65) Prior Publication Data

US 2023/0025482 A1    Jan. 26, 2023

Related U.S. Application Data

(60) Provisional application No. 63/182,199, filed on Apr. 30, 2021.

(51) Int. Cl.
*B64D 1/02* (2006.01)
*B64D 37/12* (2006.01)

(52) U.S. Cl.
CPC ............... *B64D 1/02* (2013.01); *B64D 37/12* (2013.01)

(58) Field of Classification Search
CPC ... B64D 1/02; B64D 1/04; B64D 1/08; B64D 1/12; B64D 37/12
See application file for complete search history.

(56) References Cited

U.S. PATENT DOCUMENTS

| | | | |
|---|---|---|---|
| 2,856,224 A | 10/1958 | Kelly et al. | |
| 2,921,756 A | 1/1960 | Borden et al. | |
| 2,948,563 A | 8/1960 | Landry | |
| 3,040,629 A | 6/1962 | Duncan et al. | |
| 6,926,226 B2 | 8/2005 | Gathier | |
| 7,575,403 B2* | 8/2009 | Hsieh ..................... | F16B 7/06 410/85 |

(Continued)

FOREIGN PATENT DOCUMENTS

| | | |
|---|---|---|
| RU | 2713431 | 2/2020 |
| WO | 1991/04910 | 4/1991 |

*Primary Examiner* — Joshua J Michener
*Assistant Examiner* — Ka Chun Leung
(74) *Attorney, Agent, or Firm* — Renner, Otto, Boisselle & Sklar LLP

(57) ABSTRACT

An aft pivot assembly includes a height adjustment mechanism integrated into a device for mounting a payload, to enable release of the payload. The aft pivot assembly releasably secures an aft portion of the payload, such a pod, store, ordinance, or fuel tank. The aft pivot assembly includes a shaft operable with the mount device and a release component, the shaft being rotatable about multiple shaft axes relative to the mount device so as to either minimize or eliminate carriage loads about the aft portion, while reacting jettison loads during a jettison event or phase. The rotation of the shaft about its shaft axes can further be limited via a limit device. As the payload transitions from a carriage phase to a jettison phase, the shaft moves in multiple degrees of freedom and in multiple axes relative to the mount device.

20 Claims, 7 Drawing Sheets

(56) References Cited

U.S. PATENT DOCUMENTS

| | | |
|---|---|---|
| 8,127,655 B1 | 3/2012 | Kay |
| 10,501,184 B2 | 12/2019 | Nipper et al. |
| 2017/0240282 A1* | 8/2017 | Nipper .................. B64D 37/12 |

* cited by examiner

ADJUSTABLE AFT PIVOT ASSEMBLY RELEASE COMPONENT

RELATED APPLICATION

This application claims the benefit of U.S. Provisional Application No. 63/182,199, filed Apr. 30, 2021, which is hereby incorporated herein by reference in its entirety.

GOVERNMENT LICENSE RIGHTS

This invention was made with Government support under contract number N00019-16-C-0002, awarded by the Department of Defense. The Government has certain rights in the invention.

FIELD

The disclosure is in the field of releases for releasing payloads from vehicles, such as aircraft.

BACKGROUND

Pylon attached stores or payloads on a vehicle or aircraft platform often require an aft pivot attachment to the pylon to allow for safe separation of the store (jettison), such as deploying a fuel tank during an emergency. With some aft pivot assemblies, loads imparted to the aft pivot and into the store are high during flight (carriage loads) as compared to loads during jettison or deployment (jettison loads). As such, some aft pivot assemblies attached to a payload must be configured to withstand these significant carriage loads despite the fact that the purpose of the aft pivot assembly is to support safe deployment of the payload away from the aircraft. Configuring aft pivot assemblies to accommodate and handle such carriage loads has the drawback of added structure and weight. Many existing aft pivot assemblies have a shaft translatable along its x-axis and rotatable about its x-axis relative to the aircraft. However, such assemblies have various structural limitations and can impart unnecessary carriage loads.

SUMMARY

According to an aspect of the disclosure, an aft pivot assembly has a height-adjustable release for engaging a vehicle, such as an aircraft or a pylon of an aircraft.

According to another aspect of the disclosure, an aft pivot assembly for release of a payload from a vehicle, the assembly including: a mount that mounts to the payload; a release mechanically coupled to the mount, wherein the release releasable couples to the vehicle; wherein the release is adjustable to allow for coupling variations in payload to the vehicle.

According to an embodiment of any paragraph(s) of this summary, the aft pivot assembly further includes a shaft that mechanically couples the mount to the release.

According to an embodiment of any paragraph(s) of this summary, the shaft is rotatable about multiple shaft axes relative to the mount.

According to an embodiment of any paragraph(s) of this summary, the release is height adjustable.

According to an embodiment of any paragraph(s) of this summary, the release includes an inner component within an outer housing.

According to an embodiment of any paragraph(s) of this summary, the inner component is located at least in part within a hollow defined by the outer housing.

According to an embodiment of any paragraph(s) of this summary, the inner component is contained by the outer housing.

According to an embodiment of any paragraph(s) of this summary, the outer housing includes a notch or bore for engaging the vehicle.

According to an embodiment of any paragraph(s) of this summary, the bore is configured to engage a hook or pin on the vehicle.

According to an embodiment of any paragraph(s) of this summary, the inner component has a through-hole therein for receiving the shaft or a coupling member that is coupled to the shaft.

According to an embodiment of any paragraph(s) of this summary, the outer housing has an opening that aligns with the through-hole, thereby allowing the shaft (or coupling member) to pass through the outer housing.

According to an embodiment of any paragraph(s) of this summary, the opening in the outer housing is a rectangular opening.

According to an embodiment of any paragraph(s) of this summary, the opening has a width that is substantially equal to a diameter of the through-hole.

According to an embodiment of any paragraph(s) of this summary, the through-hole is adjustable in height relative to the opening.

According to an embodiment of any paragraph(s) of this summary, the through-hole and the opening both surround the shaft, providing redundancy in capturing the shaft within the release.

According to an embodiment of any paragraph(s) of this summary, the inner component is capable of being aligned with the outer housing at a variety of relative heights.

According to an embodiment of any paragraph(s) of this summary, the inner component has external threads that engage internal threads of the outer housing.

According to an embodiment of any paragraph(s) of this summary, the inner component is threaded into and out of the outer housing to adjust height.

According to an embodiment of any paragraph(s) of this summary, the inner component has toothed external surfaces that engage toothed internal surfaces of the outer housing.

According to an embodiment of any paragraph(s) of this summary, the toothed external surfaces are on parallel opposite surfaces of the inner component.

According to an embodiment of any paragraph(s) of this summary, the inner component may be engaged at different heights within the outer housing by slidingly engaging the inner component within the outer housing at one of a variety of discrete positions, with different toothed engagements between the toothed external surfaces and the toothed internal surfaces.

According to an embodiment of any paragraph(s) of this summary, the outer housing has a scale thereon, indicating relative position of the inner component within the outer housing.

According to an embodiment of any paragraph(s) of this summary, the assembly further includes a limit device operable with the mount to limit rotation of the shaft about the multiple shaft axes during a jettison phase.

According to an embodiment of any paragraph(s) of this summary, the limit device comprises a collar extending from the mount device, the shaft extending through the collar, and wherein a volume of space is defined between the collar and the shaft to facilitate movement of the shaft about at least two shaft axes relative to the mount device during the jettison phase.

According to an embodiment of any paragraph(s) of this summary, the collar includes a conical opening.

According to an embodiment of any paragraph(s) of this summary, the inner component and the outer housing are free to rotate around the shaft as an assembly, without changes in adjustment.

According to an embodiment of any paragraph(s) of this summary, the inner component and the outer housing are lockable in place after assembly and installation.

According to an embodiment of any paragraph(s) of this summary, the assembly is in combination with the vehicle.

According to an embodiment of any paragraph(s) of this summary, the vehicle is an aircraft.

According to an embodiment of any paragraph(s) of this summary, the release engages a pylon of the aircraft.

According to an embodiment of any paragraph(s) of this summary, the assembly is in combination with the payload.

According to an embodiment of any paragraph(s) of this summary, the payload is a pod.

According to an embodiment of any paragraph(s) of this summary, the payload is a fuel tank.

According to yet another aspect of the disclosure, a method of adjusting height of a release for engaging a payload to a vehicle, includes the steps of moving an inner component of the release relative to an outer housing of the release; and securing the inner component in place within the outer housing.

According to an embodiment of any paragraph(s) of this summary, the moving includes rotating the inner component within the outer housing, with the inner component threadedly engaging the outer housing.

According to an embodiment of any paragraph(s) of this summary, the moving includes engaging external teeth of the inner component with toothed surfaces of the outer housing, at any of a variety of relative heights.

According to an embodiment of any paragraph(s) of this summary, the securing includes securing the inner component using a shaft that passes through the inner component.

According to an embodiment of any paragraph(s) of this summary, the release component is part of an aft pivot assembly.

Accomplishment of the foregoing and related ends of the disclosure comprises the features hereinafter fully described and particularly pointed out in the claims. The following description and the annexed drawings set forth in detail certain illustrative embodiments of the disclosure. These embodiments are indicative, however, of but a few of the various ways in which the principles of the disclosure may be employed. Other objects, advantages and novel features of the disclosure will become apparent from the following detailed description when considered in conjunction with the drawings.

BRIEF DESCRIPTION OF DRAWINGS

The annexed drawings, which are not necessarily to scale, show various aspects of the disclosure.

DETAILED DESCRIPTION

An aft pivot assembly includes a height adjustment mechanism integrated into a device for mounting a payload, to enable release of the payload. The aft pivot assembly releasably secures an aft portion of the payload, such a pod, store, ordinance, or fuel tank. For example, a pod may include a wide variety of add-on components that provide additional functionality, such as electronics, sensors, or radar, to give some non-limiting examples. The aft pivot assembly includes a shaft operable with the mount device and a release component, the shaft being rotatable about multiple shaft axes relative to the mount device so as to either minimize or eliminate carriage loads about the aft portion, while reacting jettison loads during a jettison event or phase. The rotation of the shaft about its shaft axes can further be limited via a limit device. As the payload transitions from a carriage phase to a jettison phase, the shaft moves in multiple degrees of freedom and in multiple axes relative to the mount device.

Figure 1:
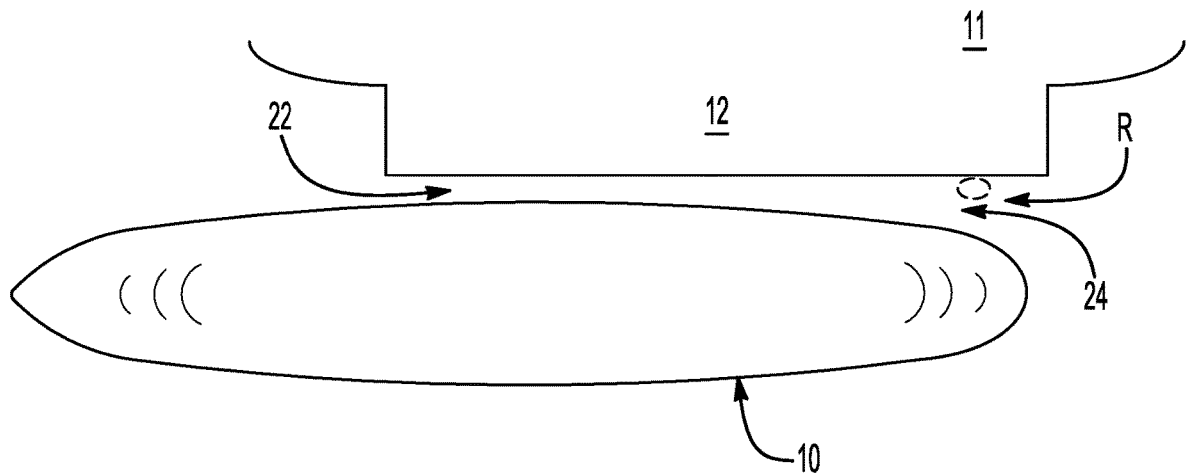
FIG. 1 is a schematic diagram showing a first step in the process of releasing a payload from a vehicle such as an aircraft.
Figure 2:
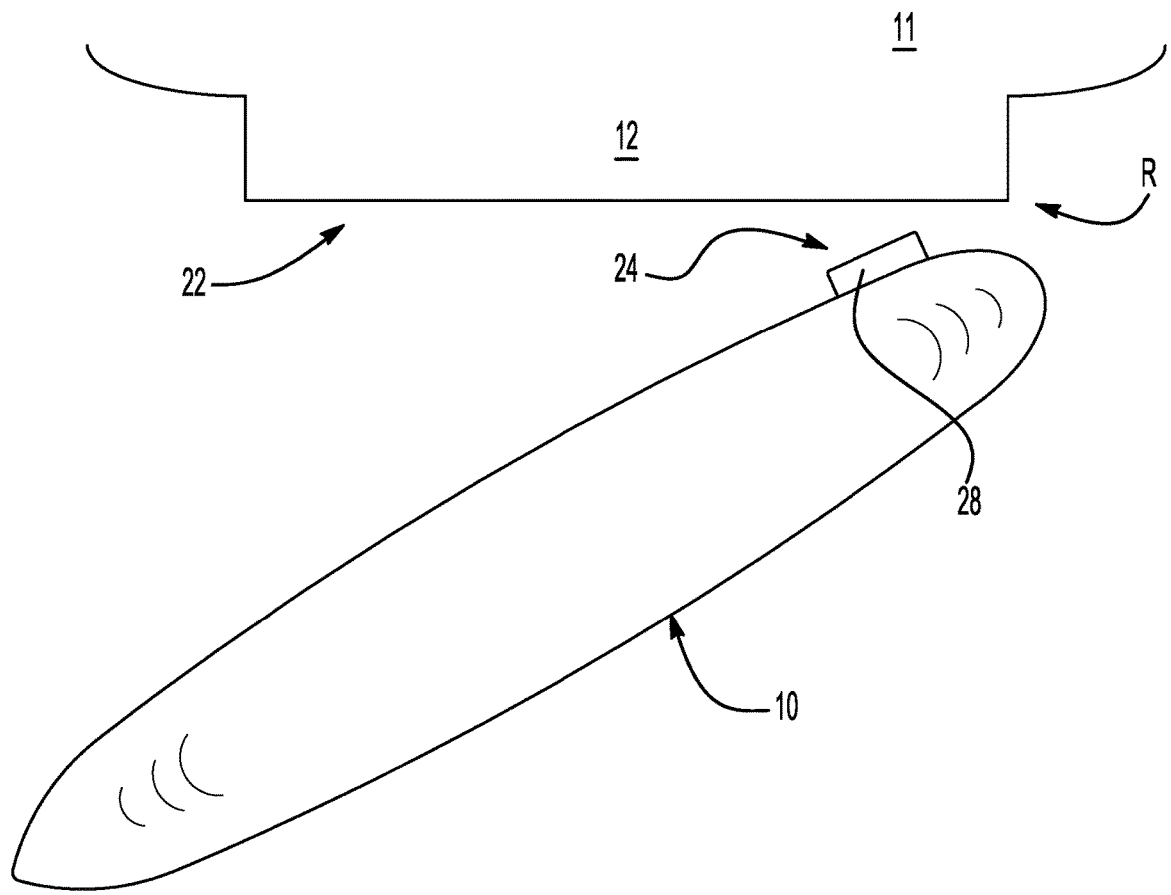
FIG. 2 is a schematic diagram showing a second step in the process of releasing the payload.

FIGS. 1 and 2 provide an overview of release of a payload 10 from a portion of a vehicle such as an aircraft 11, for example a platform or pylon 12. The term "aircraft" is intended to broadly describe aerial vehicles, including manned aircraft and unmanned aerial vehicles (UAVs). FIG. 1 shows a carriage phase where the payload 10 is coupled to the pylon 12, and FIG. 2 shows a jettison phase, where the payload 10 is separated from the pylon 12. The payload 10 is releasably coupled to a forward portion 22 of a pylon 12 of the aircraft 11. The payload 10 is also releasably coupled to an aft or rear portion 24 of the pylon or platform 12, about an aft pivot assembly 28. Certain prior aft pivot assemblies are described in co-owned U.S. Pat. No. 10,501,184, which is incorporated herein by reference in its entirety. Further embodiments of such an assembly are described below. Generally, as the payload 10 is released by the aircraft (and/or by a pilot) about the forward portion 22 of the payload 10, the payload 10 transitions from the carriage phase shown in FIG. 1 to the jettison phase shown in FIG. 2. The payload 10 will tend to be released in a downward direction (e.g., due to gravity), as illustrated in FIG. 2. This can facilitate a safe release of a payload 10. For a certain time period during jettison, an aft assembly will remain releasably attached to the rear portion 24 of the platform 12 until final (and safe) deployment of the payload 10 (and the attached assembly 28) from the aircraft.

Many aspects of aft pivot assembly embodiments described below are similar to those described in U.S. Pat. No. 10,501,184. However, all of the embodiments described herein distinguish those described in U.S. Pat. No. 10,501, 184, at least in that the embodiments described herein involve some degree of height adjustment, to compensate for variations in dimensions, for instance between different types of payloads and/or different types of items to which payloads are mounted.

The aft pivot assemblies described herein also have other advantages. They facilitate release of a payload from a vehicle while minimizing or eliminating carriage loads. The assembly can include a mount device that secures of that is securable to an aft portion of a payload of a vehicle such as an aircraft. The assembly can also include a limit device extending from (e.g., coupled to) the mount device. A shaft can be coupled to the mount device, the shaft being rotatable about multiple shaft axes. A release component can be coupled to the shaft and removably couplable to the aircraft, that it can be coupled to the aircraft and selectively removed. During a carriage phase, and as the payload transitions from a carriage phase to a jettison phase, the shaft moves in multiple degrees of freedom in multiple axes relative to the mount device. Such movements can be constrained or unconstrained.

In some examples, the limit device can include a collar having an opening through which the shaft is loosely received such that a volume of space is defined between the shaft and the collar. The assembly may also include a spherical bearing rotatably coupling the shaft to the mount device, such that the shaft is allowed to move about its y-axis and z-axis (and relative to the mount device) during the carriage phase (thus facilitating the avoidance or minimization of carriage loads about the aft portion of the payload), and further allowed to rotate about its x-axis and translates along its x-axis, during the jettison phase.

Figure 3:
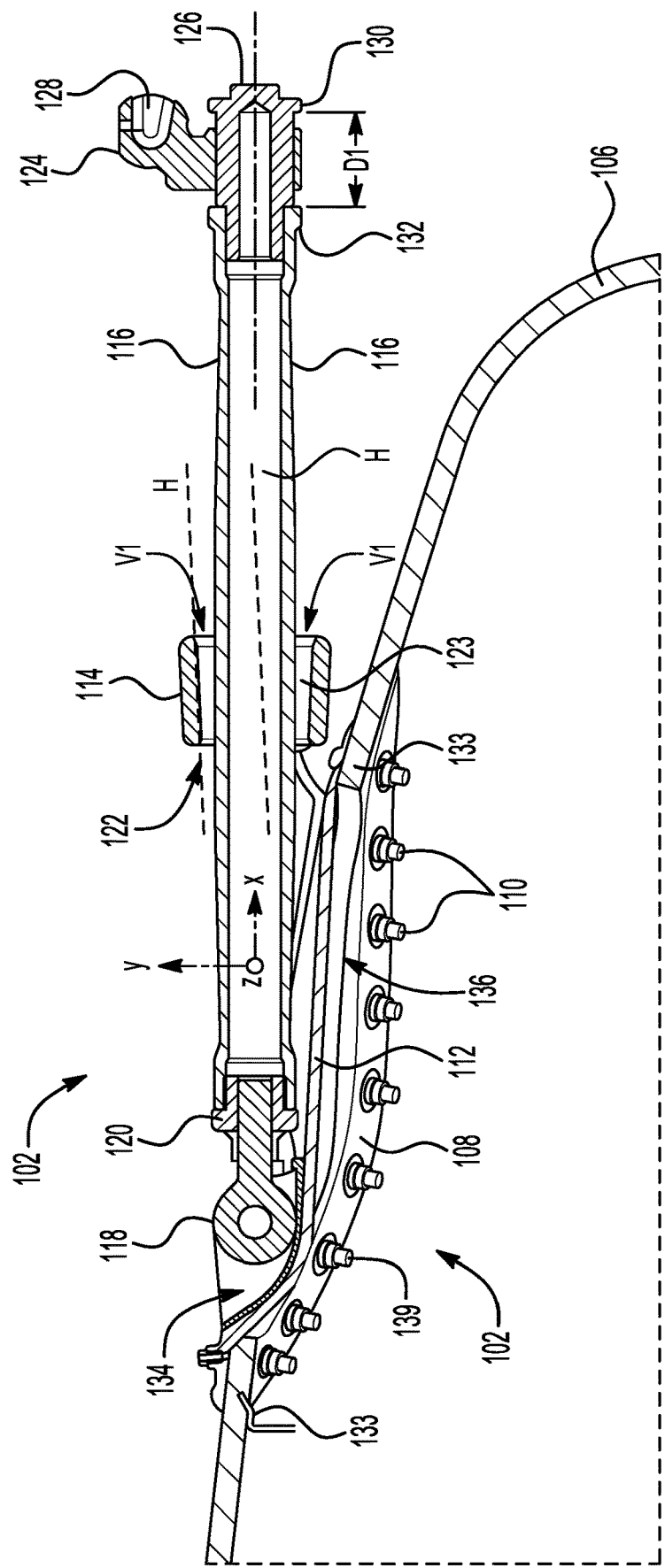
FIG. 3 is a cross-sectional view of a portion of an aft pivot assembly, in accordance with an embodiment of the disclosure.
Figure 4:
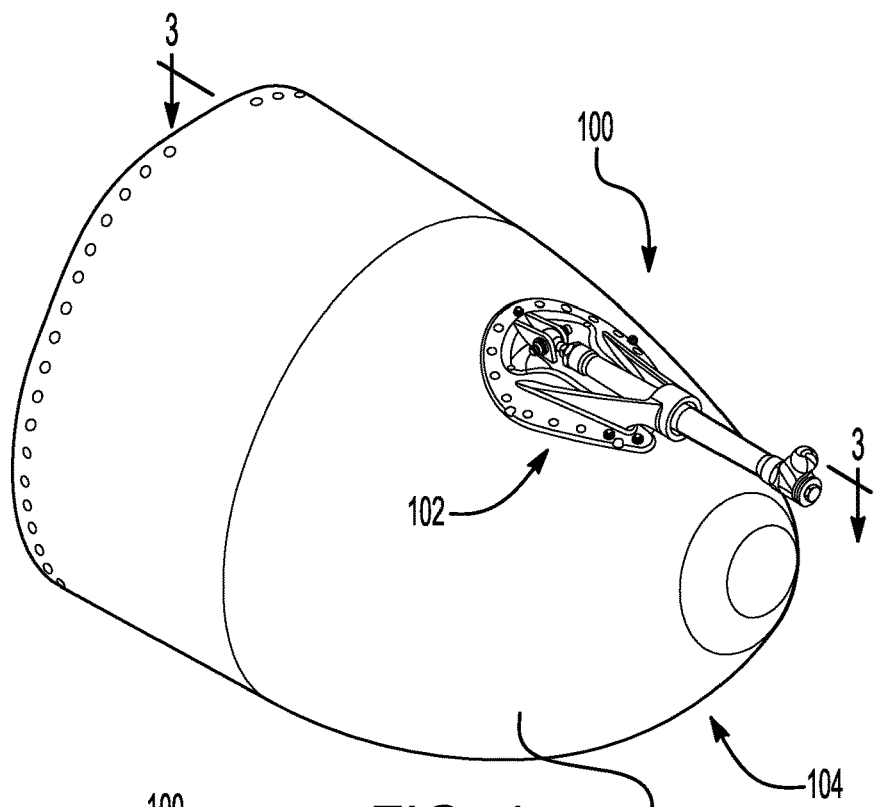
FIG. 4 is an oblique view of the aft pivot assembly portion of FIG. 3.
Figure 5:
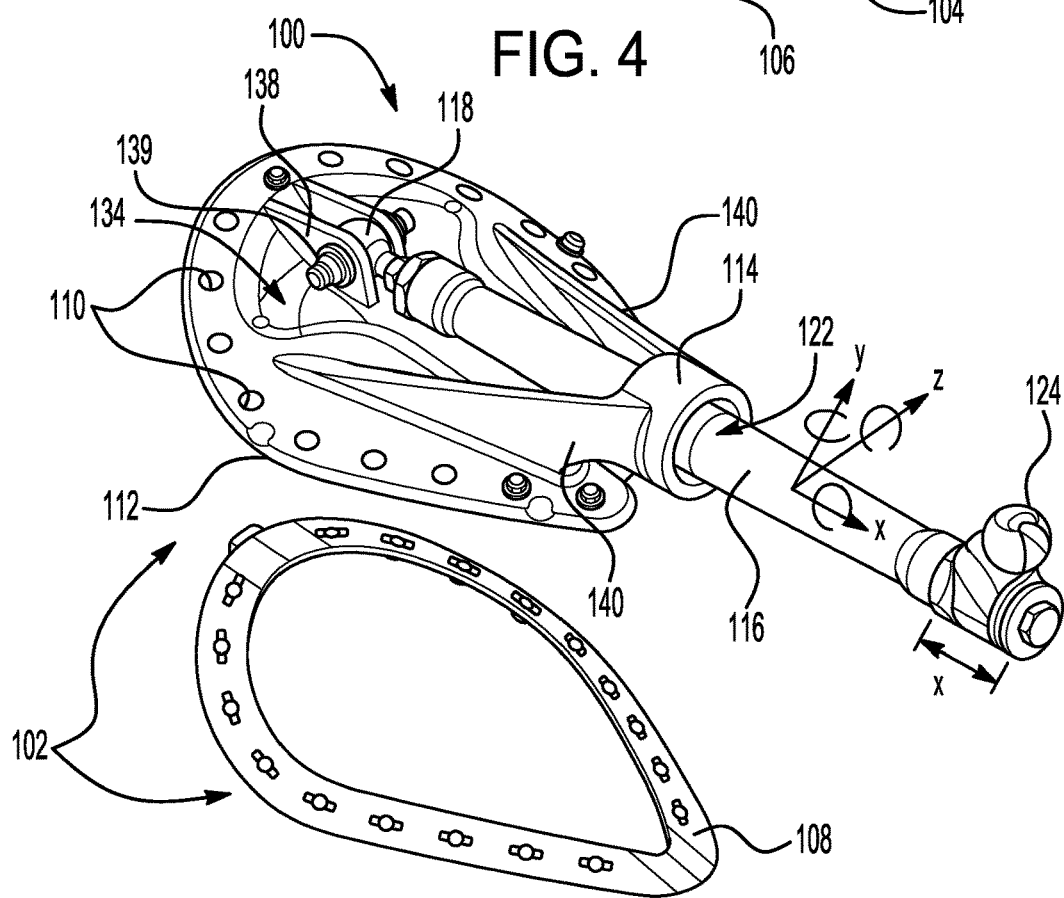
FIG. 5 is an exploded view of parts of the aft pivot assembly portion of FIG. 3.

FIGS. 3-5 show an aft pivot assembly 100 secured to a payload 106 having a payload body, the payload 106 being releasably attached to a vehicle (e.g., an aircraft) according to an embodiment. The aft pivot assembly 100 includes a mount device 102 that is securable to an aft portion 104 of a payload 106. The illustrated mount device 102 is a saddle-type mount having a lower plate 108 that is sized and configured to be positioned within, and conformed to, the body of the payload 106 that can be fastened to an upper plate 112, sized and configured to be positioned without and conform to the body of the payload, by fasteners 110. In other words, the upper plate 112 can be positioned substantially external to the payload 106 about an external or outer surface (see FIGS. 3 and 5), with the lower plate 108 being positioned internal to the payload about an internal or inner surface. The assembly 100 may include a limit device, such as a protrusion or collar 114, extending from or coupled to the mount device 102. A shaft 116 is rotationally coupled to the mount device 102 by a spherical bearing 118 to facilitate rotation of the shaft about its y-axis and/or z-axis (and relative to the mount device 102), as represented by the respective arrows in FIG. 5. A retaining collar 120 attaches the shaft 116 to the spherical bearing 118.

The collar 114 extends rearward from the mount device 102 and has an opening 122 through which the shaft 116 is loosely received (FIGS. 3 and 5). The opening 122 may have any suitable shape, such as a conical (or cylindrical) shape, with any of a variety of suitable cross-sectional shapes, and may include a stop surface 123. The collar 114 can have a tapered bore, for example such that a diameter of the collar 114 tapers from a smaller diameter to a larger diameter in a direction going from a forward location to a rearward location of the collar 114. In other words, a forward diameter can be configured to be smaller than a rearward diameter of the collar 114, as shown in FIG. 3. A volume of space V1 is defined between the shaft 116 and the stop surface 123 of the opening 122, thus allowing the shaft to "float" within the collar 114. This can provide limited movement or rotation about its y-axis and z-axis (and relative to the mount device). In other words, the spherical bearing 118 facilitates limited movement of the shaft 116 about its y-axis and z-axis relative to the mount device 102 up to the stop surface 123 of the collar 114. FIG. 3 shows the mount device 102 and the payload 106 in the carriage phase, and the range of y and z rotational movement of the shaft 116 during the jettison phase is shown by dashed lines H, showing the limits of the movement of the shaft 116 as it is rotated up to the stop surface 123 about the y and/or z-axes of the shaft 116.

The assembly 100 includes a height-adjustable release component 124 for releasably coupling to an aircraft (not shown in FIGS. 3-5). The shaft 116 can be rotationally coupled to the release component 124 about an interface of the release component 124, such as an aperture or hole that the shaft 116 interfaces with. In one example, a shaft member 126 attached to one end of the shaft 116 can be rotationally coupled to the release component 124. Alternatively, the release component 124 can directly receive the shaft 116. In any event, the release component 124 and its interface with the shaft 116 (as well as the interface of the shaft 116 with the mount device 102) facilitates unconstrained rotation of the shaft 116 about its x-axis relative to the mount device 102 and the release component 124 (and consequently rotation of the shaft about the aircraft). The release component 124 can have a notch (or bore) 128 configured to receive a hook or pin (not shown) of a platform of an aircraft to allow release of the payload 106 during jettison (FIG. 2). A ball and pin type of joint can be used in the aircraft payload deployment. However, the release component 124 of the present disclosure is not limited to a pin joint. The release component 124 can be any suitable rotational or releasable system, such as a hook, slot, latch, or the like.

In addition, the release component 124 may be able to slide along (or translate in a longitudinal direction relative to) the shaft 116. The release component 124 may be able to rotate about the shaft 116. The sliding (longitudinal translation) and the rotation may be accomplished without changing the height adjustment of the release component 124.

As described in greater detail below with regard to multiple different embodiments, the release component 124 may include a height adjustment mechanism. This may allow rapid and controlled adjustment of height of the release component 124 to allow the release component 124 to properly engage both the aircraft and the shaft 116. Toward that end the release component 124 may have a pair of parts that can be adjusted in position relative to one another and may be able to be locked in place at different positions. One of the pieces may engage the shaft 116, and the other piece may include the notch (bore) 128 for engaging the aircraft.

In some examples, the shaft 116 can include a rear stop portion 130 and the shaft member 126 can include a forward stop portion 132 to allow the shaft 116 to traverse or linearly travel a limited distance along its x-axis relative to the release component 124, as represented by arrows Dl. The rear stop portion 130 and the forward stop portion 132 provide hard stops that can be engaged.

Concurrently or separately from the y and z axis rotation of the shaft 116 as described above, the shaft 116 can be configured to rotate unconstrained about its x-axis and traverse along its x-axis up to the stop portions 130 and 132 of the shaft 116, during the jettison phase.

The mount device 102 configuration described herein can be advantageous in reducing or eliminating carriage loads exerted on the aft portion 104 of the payload 106, as well as in withstanding jettison loads during the jettison phase. For example, the mount device 102 can include the lower plate 108 and the upper plate 112 fastened together on opposing sides of a wall portion 133 of a payload body of the payload 106, with the wall portion 133 defining a hole 136 in the payload body (FIG. 3). The upper plate 112 can have a relatively large surface area (as compared to the other components of the assembly) that mates to the external surface of the payload 106. This aids in displacing loads across a large area of the payload 106 during jettison. Furthermore, the upper plate 112 can include a recess or recess portion 134 that is at least partially disposed through the payload hole 136 (i.e., located or positioned below the upper or external surface of the payload as made possible by the payload hole 136). A pair of flange mounts 138 may be formed and supported about the upper plate 112, the flange mounts 138 extending from the recess 134. The spherical bearing 118 can be positioned between and supported about the flange mounts 138 and rotationally coupled thereto via a fastener 139. The flange mounts 138 can be positioned lower than the external surface of the upper plate 112 and positioned a particular distance forward of the opening 122 of the collar 114 to reduce or optimize loads on the payload during jettison.

The collar 114 can include a pair of collar flanges 140 formed along a length of the mount device 102 and on either side of the shaft 116. The collar 114 can extend and be positioned rearward of the pivot point of the shaft 116 (i.e., the spherical bearing 118). This adds stiffness to the mount device 102 and further distributes loads during jettison. The opening 122 of the collar 114 may be located a particular distance rearward of the spherical bearing 118 and rearward of the upper plate 112, such that loads are carried from the shaft 116 and the release component 124 to the mount device 102, and consequently to a region of the payload 106, during jettison.

Advantageously the aft pivot assembly 100 (as well as those described below) is configured to provide additional degrees of freedom (i.e., rotation of the shaft in the y-axis and/or the z-axis) over prior assemblies, such that carriage loads are reduced, minimized, and/or eliminated, while at the same time permitting the pivot assembly to engage to react jettison loads.

What follows now are descriptions of various embodiments of the release component 124. The embodiments that follow may be integrated into the assembly 100 shown and described above (or an assembly with similar features).

Figure 6:
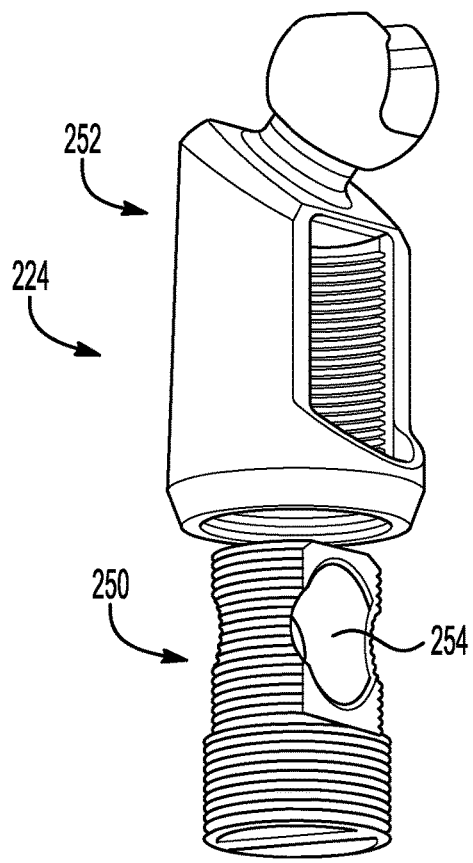
FIG. 6 is an exploded view of a height-adjustable aft pivot assembly release in accordance with an embodiment of the disclosure.
Figure 7:
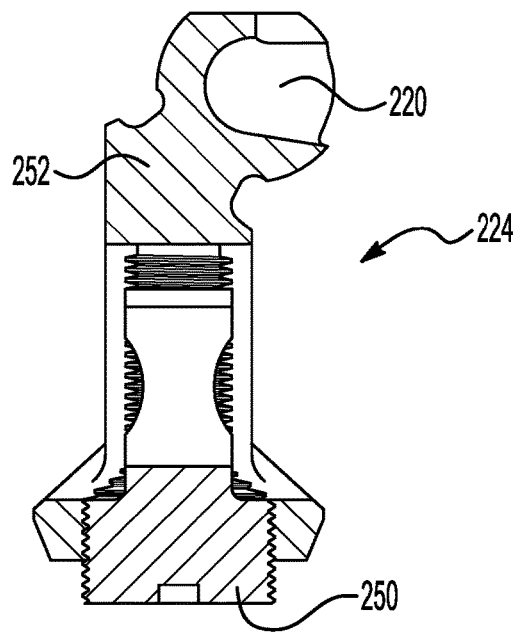
FIG. 7 is a cross-sectional view of the release of FIG. 6.
Figure 8:
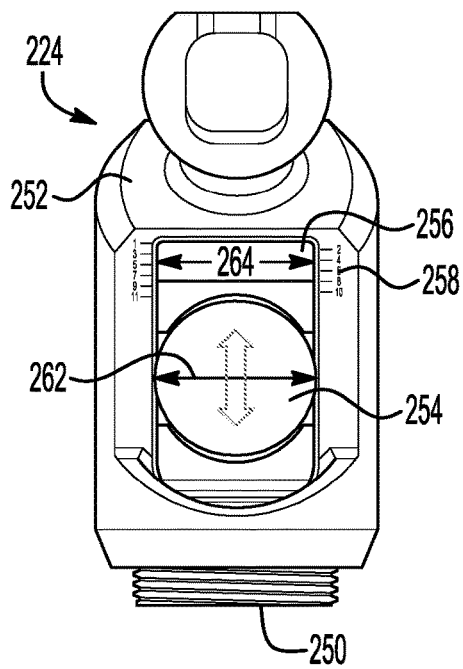
FIG. 8 is an end view of the release of FIG. 6.
Figure 9:
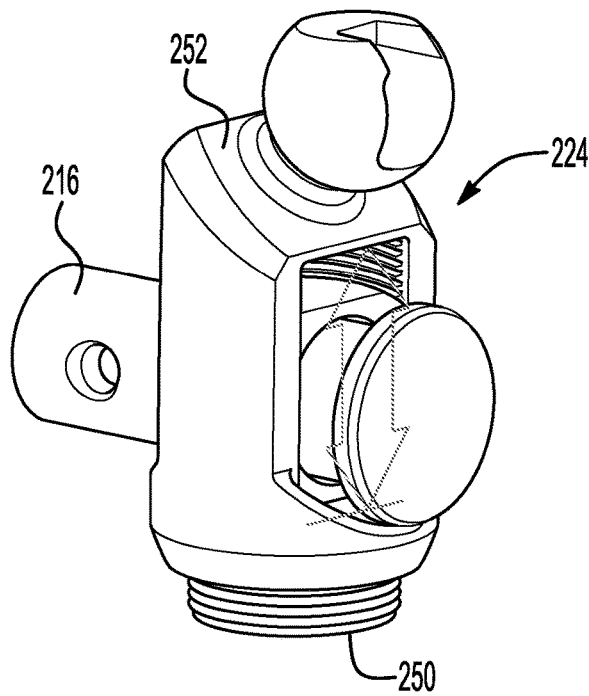
FIG. 9 is an oblique view of the release of FIG. 6, in combination with a shaft end.

FIGS. 6-8 show a release component 224, which has an inner component 250 that is threaded into a housing 252, in order to provide height adjustment. To that end an outer surface of the inner component 250 has threads that engage inner threads on an internal surface in a hollow of the housing 252. The housing 252 includes a notch (bore) 228 for engaging the vehicle, in a manner similar to that described above for the notch (bore) 128 (FIG. 3). The inner component 250 has a circular through-hole 254 for receiving and securing a shaft 216 (FIG. 9) therein.

The inner component 250 threads into the outer housing 252, to enable adjustment of the height of the inner component 250 within the outer housing 252. The outer housing 252 has a rectangular opening 256 that also allows the shaft 216 through. The outer housing 252 may have a scale 258 alongside the rectangular opening 256, which provides an indication of the position of the inner component 250 within the outer housing 252. For example, various markings on the scale 258 may provide an indicator of the position of a top edge or surface 260 of the inner component 250. The inner component 250 may be placed at a number of discrete heights relative to the outer housing 252, heights that correspond to positions where the through-hole 254 is aligned with the opening 256. These may correspond to half-turns of the inner component 250 as the inner component 250 is threaded into or out of the outer housing 252.

Figure 10:
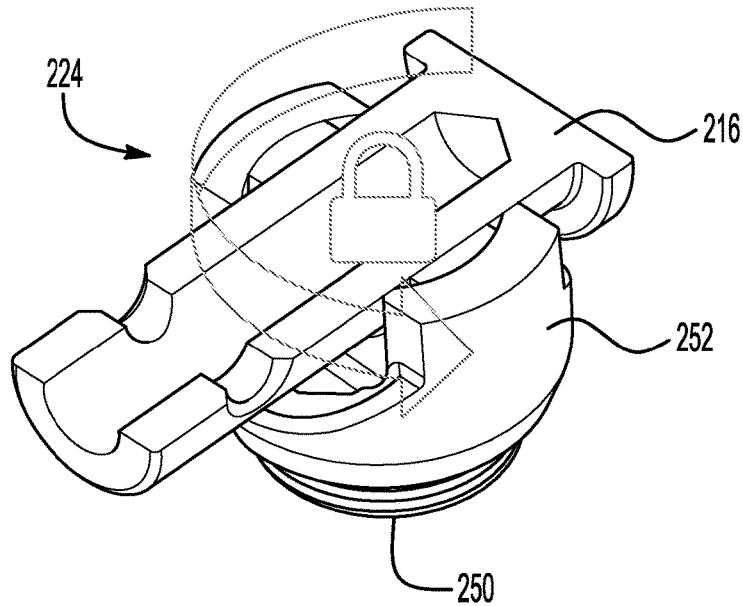
FIG. 10 is a cutaway view of the release-and-shaft-end combination of FIG. 9, showing resistance to rotation.

The through-hole 254 may have a diameter 262 that is about the same as a width 264 of the rectangular opening 256. The diameter 262 may be the same as or substantially the same as the width 264. This similarity may be for example, within 1%, 2%, or 5%, to give non-limiting values. This allows the shaft 216 to be secured without rotation of the inner component 250 within the housing 252, as shown in FIG. 10. This prevents rotation that would tend to thread in or unthread the inner component 250 within the housing 252. It also eliminates a degree of rotational freedom at the coupling between the shaft 216 and the release component 224. Having the shaft 216 secured within both the inner component 250 (passing through the hole 254) and the outer housing 252 (passing through the opening 256) provides redundancy in capturing the shaft 216 within the release component 224.

Figure 11:
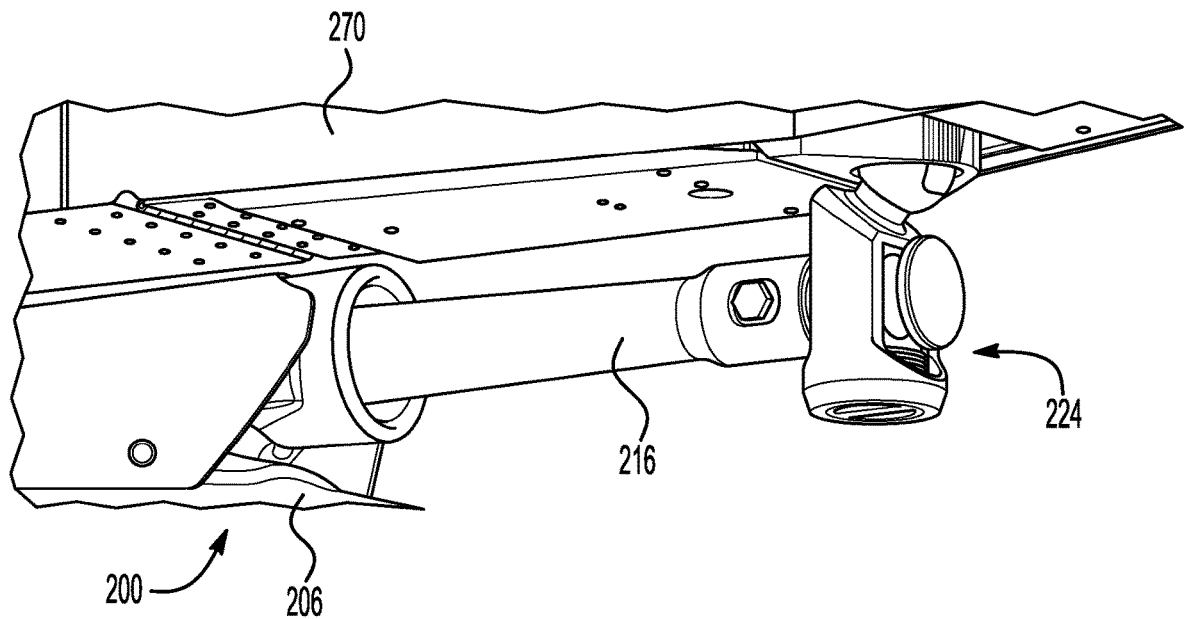
FIG. 11 shows the release of FIG. 6, as a part of an aft pivot assembly.

FIG. 11 shows the release component 224 as part of an assembly 200 for coupling a payload 206 to an aircraft 270. The shaft 216 is coupled to the release component 224 as described above. Many of the components of the assembly 200 are similar to those of the assembly 100 (FIG. 3).

Figure 12:
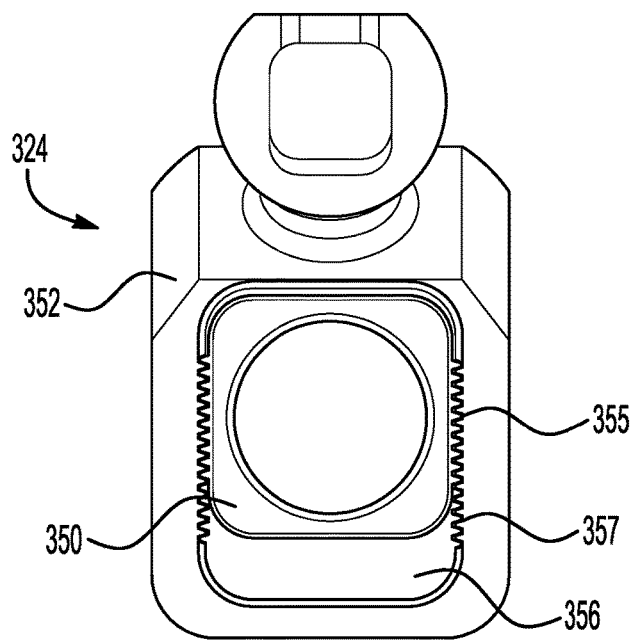
FIG. 12 is an end view of a height-adjustable aft pivot assembly release in accordance with an embodiment of the disclosure.
Figure 13:
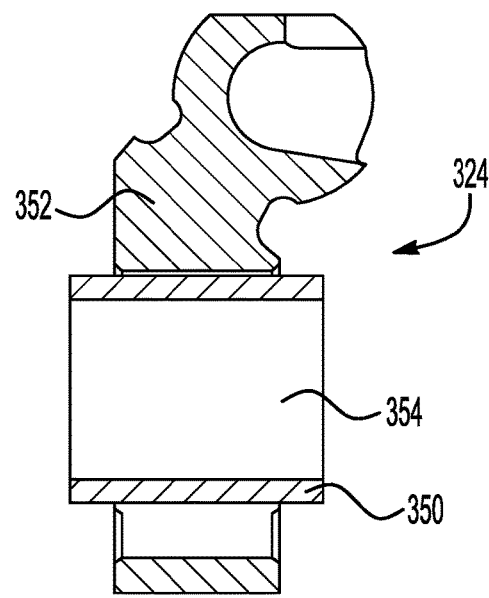
FIG. 13 is a cross-sectional view of the release of FIG. 12.
Figure 14:
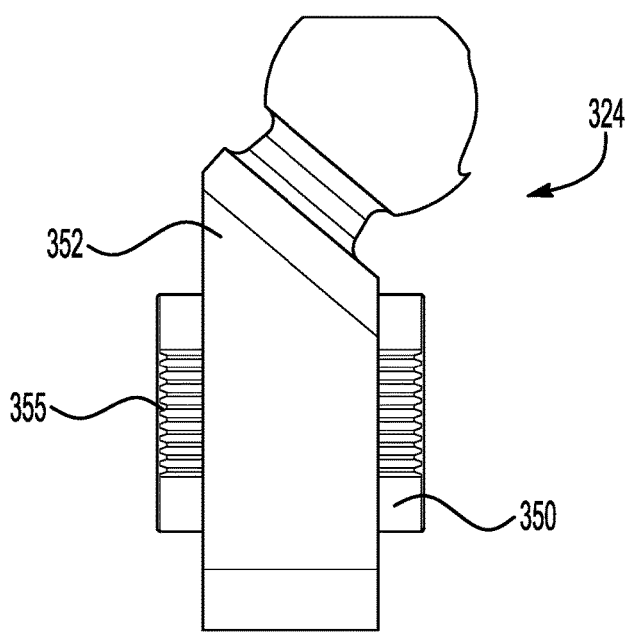
FIG. 14 is a side view of the release of FIG. 12.

FIGS. 12-14 show another embodiment, a release component 324 that has an inner toothed member or component 350 that is able to engage an outer housing 352 at various heights. The inner component 350 has external teeth 355 on parallel sides. These external teeth 355 engage corresponding internal teeth 357 on inner surfaces of the outer housing 352. As with the release component 224 (FIG. 6), the inner component 350 has a through-hole 354 that aligns with a rectangular opening (or other-shaped opening) 356 through the outer housing 352. The inner component 350 may slide into engagement with the housing 352 at various discrete heights, with different of the teeth 355 and 357 engaging with one another. The teeth on the opposite sides of the inner component 350 and the outer housing 352 may be offset from one another, such that rotation of the inner component 350 by 180 degrees may allow adjustment of the height by half of the distance between adjacent of the teeth 355 and 357. This enables more and finer adjustment steps in the height of the release component 324. The inner component 350 may have a length such that, when engaged with a shaft, such as between stops, the inner component 350 remains engaged with the housing 352 once the two have been coupled together in an assembly, at a desired height.

Figure 15:
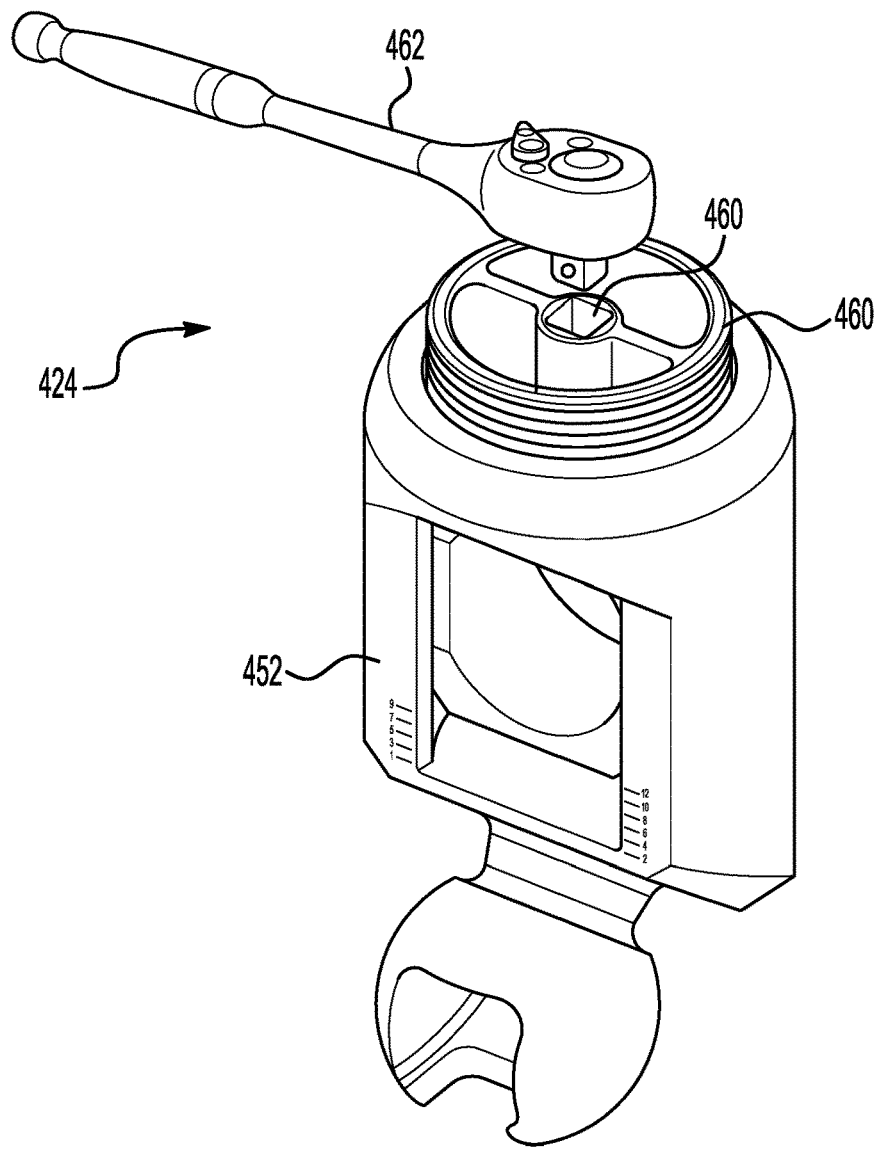
FIG. 15 is an oblique view of a height-adjustable aft pivot assembly release in accordance with another embodiment of the disclosure.

FIG. 15 shows an alternative configuration release component 424, that, in a manner similar to that described above with regard to the release component 224 (FIG. 6), includes an inner component 450 that is threaded into an outer component 452. Unlike in the inner component 250 (FIG. 6) of the release component 224, the inner component 450 includes a recess or cavity 460 for receiving a suitable tool, such as an insert of a socket drive 462, to facilitate rotation of the inner component 450 relative to the outer component 452.

Figure 16:
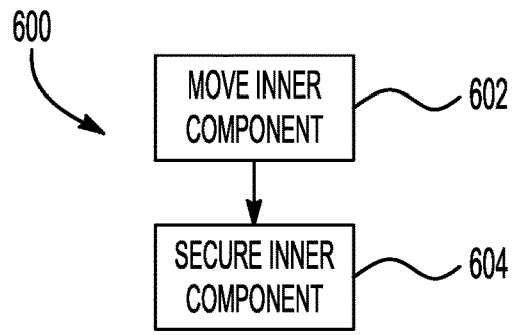
FIG. 16 is a high-level flow chart for a method of height adjustment of a release, according to an embodiment of the disclosure.

FIG. 16 shows a high-level flow chart a method 600 of adjusting height of a release for engaging a payload to a vehicle, the release being part of an aft pivot assembly, such as that described above. In step 602, an inner component of the release is moved relative to an outer housing of the release. The moving may include either rotating the inner component within the outer housing, with the inner component threadedly engaging the outer housing; or engaging external teeth of the inner component with toothed surfaces of the outer housing, at any of a variety of relative heights.

In step 604 the inner component is secured in place within the outer housing. The securing may include securing the inner component using a shaft that passes through the inner component.

Although the disclosure has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. An aft pivot assembly for release of a payload from a vehicle, the assembly comprising:
   a mount that mounts to the payload; and
   a release mechanically coupled to the mount, wherein the release releasably couples to the vehicle; and
   a shaft that mechanically couples the mount to the release;
   wherein the release is coupled to a distal end of the shaft; and
   wherein the release is internally height adjustable relative to a radial direction away from an axis of the shaft to allow for coupling variations in payload to the vehicle.

2. The aft pivot assembly of claim 1, wherein the release is height adjustable.

3. The aft pivot assembly of claim 1,
   wherein the shaft is rotatable about multiple shaft axes relative to the mount.

4. The aft pivot assembly of claim 1,
   in combination with the vehicle;
   wherein the vehicle is an aircraft.

5. The aft pivot assembly of claim 4, wherein the release engages a pylon of the aircraft.

6. The aft pivot assembly of claim 1, wherein the release includes an inner component within an outer housing.

7. The aft pivot assembly of claim 6, wherein the inner component and the outer housing are free to rotate around the shaft as an assembly, without changes in adjustment.

8. The aft pivot assembly of claim 6, wherein the inner component and the outer housing are lockable in place after assembly and installation.

9. The aft pivot assembly of claim 6, wherein the inner component has external threads that engage internal threads of the outer housing.

10. The aft pivot assembly of claim 9, wherein the inner component is threaded into and out of the outer housing to adjust height.

11. The aft pivot assembly of claim 9, wherein the inner component includes a cavity for receiving a tool, which facilitates rotation of the inner component relative to the outer component.

12. The aft pivot assembly of claim 6, wherein the inner component has a through-hole therein for receiving the shaft.

13. The aft pivot assembly of claim 12, wherein the outer housing has an opening that aligns with the through-hole, thereby allowing the shaft to pass through the outer housing.

14. The aft pivot assembly of claim 13,
    wherein the outer housing includes a notch or bore for engaging the vehicle; and
    wherein the bore is configured to engage a hook or pin on the vehicle.

15. The aft pivot assembly of claim 13, wherein the opening in the outer housing is a rectangular opening.

16. The aft pivot assembly of claim 13, wherein the opening has a width that is substantially equal to a diameter of the through-hole.

17. The aft pivot assembly of claim 13, wherein the through-hole is adjustable in height relative to the opening.

18. The aft pivot assembly of claim 13, wherein the through-hole and the opening both surround the shaft, providing redundancy in capturing the shaft within the release.

19. An aft pivot assembly for release of a payload from a vehicle, the assembly comprising:
    a mount that mounts to the payload; and
    a release mechanically couples to the mount, wherein the release releasably couples to the vehicle;
    wherein the release is adjustable to allow for coupling variations in payload to the vehicle;
    wherein the release includes an inner component within an outer housing;
    wherein the inner component has toothed external surfaces that engage toothed internal surfaces of the outer housing;
    wherein the toothed external surfaces are on parallel opposite surfaces of the inner component; and
    wherein the inner component may be engaged at different heights within the outer housing by slidingly engaging the inner component within the outer housing at one of a variety of discrete positions, with different toothed engagements between the toothed external surfaces and the toothed internal surfaces.

20. A method of adjusting height of a release for engaging a payload to a vehicle, the release being part of an aft pivot assembly, the method comprising:
    moving an inner component of the release relative to an outer housing of the release, wherein the aft pivot assembly includes a shaft, a distal end of which is coupled to the release, wherein the movement of the inner component is height adjustable relative to a radial direction away from an axis of the shaft; and securing the inner component in place within the outer housing, wherein the moving includes either 1) rotating the inner component within the outer housing, with the inner component threadedly engaging the outer housing, or 2) engaging external teeth of the inner component with toothed surfaces of the outer housing, at any of a variety of relative heights; and wherein the securing includes securing the inner component within the outer housing using the shaft, which passes through the inner component.

* * * * *